United States Patent [19]
Bromley

[11] Patent Number: 5,340,546
[45] Date of Patent: Aug. 23, 1994

[54] GAS FILTER

[76] Inventor: David Bromley, 1305 Yardley Commons, P.O. Box 513, Yardley, Pa. 19067

[21] Appl. No.: 42,715

[22] Filed: Apr. 5, 1993

[51] Int. Cl.$^5$ .............................................. B01D 35/30
[52] U.S. Cl. ..................... 422/168; 422/101; 422/104; 55/513; 55/519; 210/450; 436/177
[58] Field of Search ................ 422/101, 168, 86, 104, 422/88, 305; 436/175, 177, 178; 55/512, 513, 514, 519; 210/446, 450

[56] References Cited

U.S. PATENT DOCUMENTS

| | | | |
|---|---|---|---|
| 2,751,999 | 6/1956 | Semon | 55/513 |
| 3,353,339 | 11/1967 | Walter | 55/512 |
| 3,586,064 | 6/1971 | Brown et al. | 422/101 |
| 3,685,970 | 8/1972 | Moir | 422/101 |
| 4,283,284 | 8/1981 | Schnell | 210/450 |
| 4,342,724 | 8/1982 | Narra | 422/101 |
| 4,473,471 | 9/1984 | Robichaud et al. | 210/450 |
| 4,600,512 | 7/1986 | Aid | 210/450 |
| 4,812,293 | 3/1989 | McLaurin et al. | 422/101 |
| 4,871,675 | 10/1989 | Coupek et al. | 422/101 |
| 5,013,668 | 5/1991 | Fields | 422/88 |
| 5,130,022 | 7/1992 | Chara | 210/450 |

Primary Examiner—Robert J. Warden
Assistant Examiner—Hien Tran
Attorney, Agent, or Firm—Gerald Post

[57] ABSTRACT

A gas filter comprising a tube open at one end for insertion of the element and a threadedly connectable end cap for closing the housing are disclosed. Attached to the end cap and also to the opposite end of the housing are receptacles for receiving the ends of the filter therebetween. The receptacles are faced with a resilient seal to make the connection between the receptacle and the filter air-tight as the end cap is tightened. After effecting the seal at both ends of the filter, a pair of hollow hypodermic needles pierce membranes that closed off the ends of the filter. The other ends of the needles extend out of the housing at both ends allowing the connection of an inlet and outlet gas hose thereby establishing fluid communication between the hoses and permit gas to flow through the filter for cleansing. Two embodiments are disclosed. In one, the movable end cap is prevented from rotating thereby precluding the transmission of rubbing action between the seal and the membrane during closure of the housing thereby aiding in preserving the integrity of the membrane until it is pierced.

5 Claims, 2 Drawing Sheets

GAS FILTER

BACKGROUND OF THE INVENTION

1. Field of the Invention

The present invention is directed to the field of devices for retaining a filtering element containing active reagents for cleansing the gas passing through a gas line for feeding a processing system, and the means for replacing the filter without contaminating the system.

2. Description of the Prior Art

Many processes require a supply of various gases that must be kept scrupulously clean in order to achieve accurate results within the process. It is important to keep contaminants apart from the reacting agents and the delicate instrumentation used in the process since such contamination would affect the results. Gas chromatography is one such process where moisture, oxygen, carbon dioxide and airborne particulate matter must be prevented from entering the system. Aside from yielding fallacious results, these unwanted materials can also damage precision metering devices installed in such a system.

Many filtering elements are available that adsorb gases and trap solids and they are very effective as long as the adsorbent is active and the gas lines are continuous and not exposed to the atmosphere. However, from time to time is necessary to open the system in order to replace the filtering element. Doing so requires breaking the gas line by opening the filter housing thereby creating the problem of exposing the internal components of the system to the atmosphere. Prior art devices provide cut-off valves in the lines surrounding the break to exclude contaminants, but no means is provided to prevent contaminating material from entering through the space between the valves while the replacement filter is being installed. None of the prior art devices known effectively eliminates the entry of outside air into the system when it is opened for replacement of the filtering element.

SUMMARY OF THE INVENTION

The present invention overcomes the problems encountered by the prior art devices when the gas line is interrupted to replace the filtering element. It is the principle object of this invention to provide a device that allows replacement of the filter in a system by first sealing access to the gas passageways, and afterwards completing fluid communication through the reagent thereby keeping the system sealed from contaminants.

A further object is to provide a device where the replacement of the filter is rapid and requires no tools thereby reducing costly downtime.

A still further object is to provide a mechanism that retains the integrity of the seals protecting the system during filter replacement.

A still further object is to provide a retaining device where the process gases only come into contact with materials with which they will not react adversely.

These and other objects are achieved by the preferred embodiment of the present invention in which a quantity of filtering reagent housed in a filter cartridge element is in fluid communication with the entering and exiting gas line. A pair of hollow piercing members having a fitting at one end for receiving an input gas line and a hypodermic needle-like piercer at the other end is disposed concentrically within a retainer that securely holding the filter cartridge.

As the retainer is closed around the replacement filter, a series of elastomeric seals isolates the fluid passageways in the system precluding the entrance of outside air. After the system has been sealed, the piercers disposed at opposite ends of the retainer penetrate closure membranes that seal the ends of the filter cartridge thereby establishing fluid communication from the inlet fitting, through the filter and through the outlet fitting is thereby established.

Having in mind the above and other objects that will be obvious from an understanding of the disclosure, the present invention comprises a combination and arrangement of parts illustrated in the presently preferred embodiment of the invention which is herein set forth in sufficient detail to enable those persons skilled in the art to clearly understand the function, operation, construction and advantage of it when viewed in conjunction with the accompanying drawings.

BRIEF DESCRIPTION OF THE DRAWINGS

The invention will be described in detail, by way of example, with reference to the accompanying drawings in which.

DETAILED DESCRIPTION OF THE PREFERRED EMBODIMENTS

Figure 1:
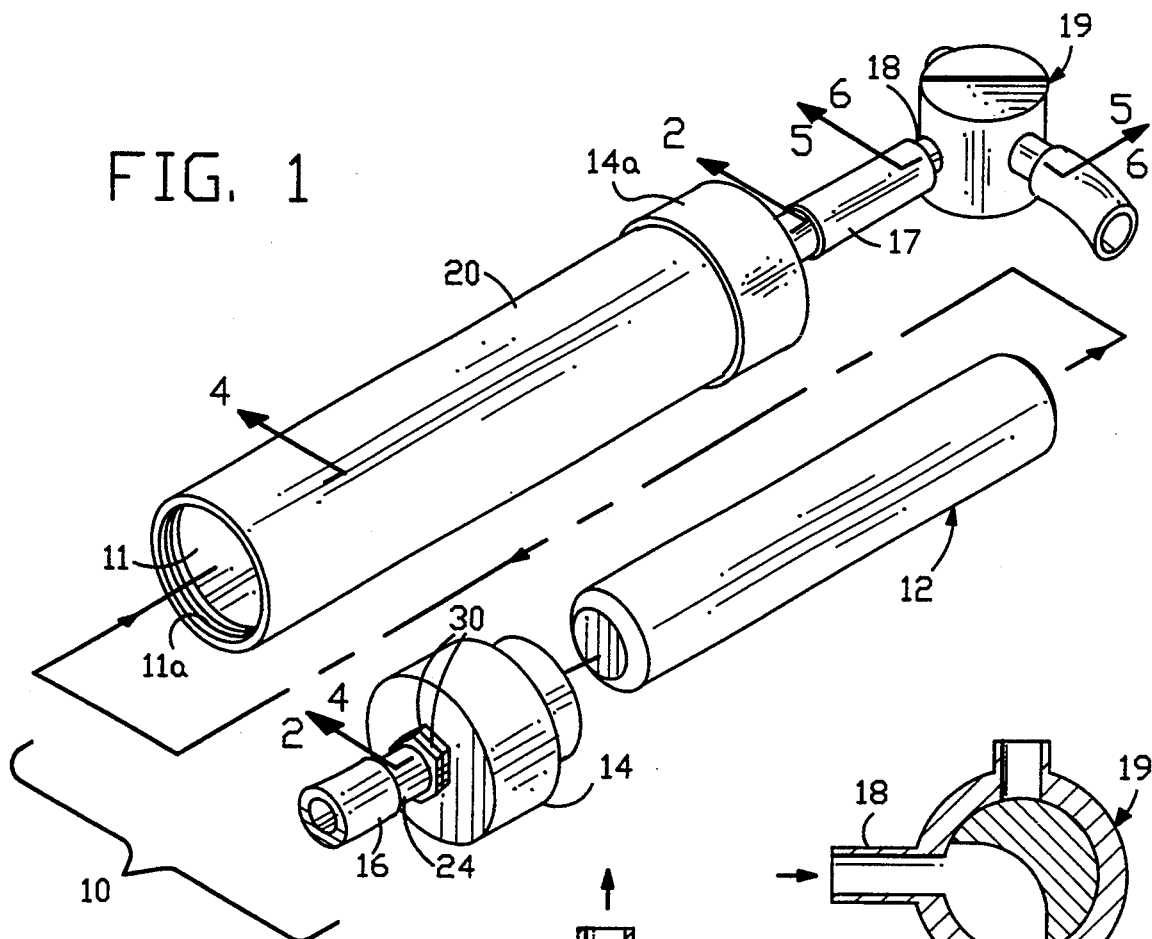
FIG. 1 is an exploded pictorial view of the retainer.
Figure 2:
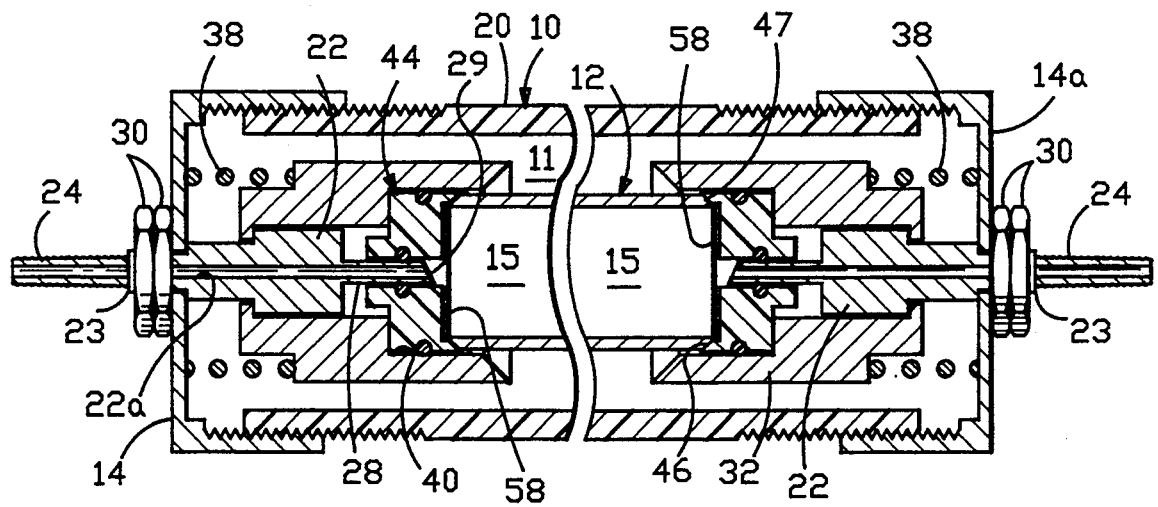
FIG. 2 is a sectional view taken along line 2—2 in FIG. 1 showing the retainer at the start of closure.
Figure 3:
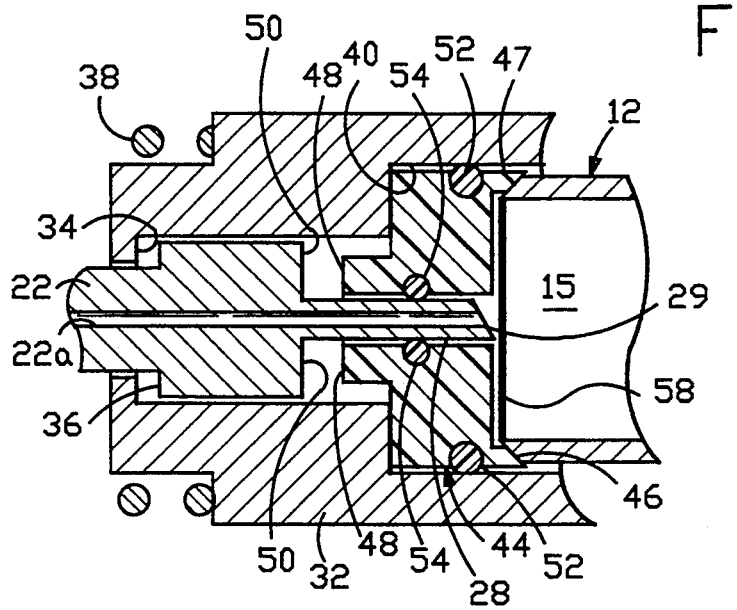
FIG. 3 is an enlarged partial sectional view of the internal components of the device shown with the retainer sealed.

Referring to FIGS. 1, 2 and 3 of the drawing and in accordance with the principles of the invention, a filter housing or retainer 10 is shown. The housing 10 is a cylindrical member comprising an elongated hollow tube 20 preferably made of acrylic plastic and threaded at both ends for receiving one of a pair of end caps 14, 14i a each having cup shaped portions. A chamber 11 having an opening 11a for receiving and retaining an inserted filtering element 12 filled with active reagents 15 for removing gaseous impurities and other contaminants is disposable within the housing 10. The chamber 11 is defined by the tube 20 closed at the end opposite the opening 11a by an end cap 14a. A gas inlet hose 16 extends from one end of the retainer 10 and a gas outlet hose 17 extends from the other end. One port 18 of a two-way valve 19 is connected to the free end of the outlet hose 17.

In this embodiment, the retainer housing 10 is constructed of indentical components at each end disposed in a mirror image relationship. Although the components at one end of the device will herein be described, it will be understood that identical members are situated at the other end and function in the exact same manner.

Concentrically affixed to each of the end caps 14, 14a is a piercing member 22 having at one end 23 a hollow fitting 24 extending out of the retainer 10 and adapted to securely receive the inlet or outlet hoses 16, 17 and having at its other end a portion containing a hypodermic-like hollow piercing needle 28 having a piercing tip 29 cut at an angle. The needle 28 is in fluid communication with the end fitting 24. The piercing member 22 is secured to its related end cap 14 with locking nuts 30 or the similar retaining devices.

Surrounding the piercing member 22 is a concentrically and slideably disposed receptacle 32. The receptacle 32 includes a flange 34 configured to abut a shoulder 36 on the piercing member 22, thereby limiting the inward axial movement of the flange 34. A coil spring 38 positioned between the end cap 14, 14a and the receptacle 32 biases the flange 34 toward the shoulder 36 and provides a sealing force as will be explained later. The receptacle 32 includes a pocket 40 for closely and concentrically receiving the symmetrical cylindrical filtering element cartridge 12. These internal components are preferably constructed of a grade of stainless steel alloy impervious to the transmitted fluid.

A number of seals for preventing infiltration of outside air are incorporated in the design of the retainer 10. The seals can be fabricated of any elastomer that is impervious to the fluids and gases passing through the system and are preferably made of a resilient tetrafluorethylene (TFE) type polymer. A first sealing member 44 is configured to fit into the pocket 40 of the receptacle 32 and around the piercing needle 28. It includes an internal chamfer 46 at one end that matches the end configuration 47 of the filtering element 12 so as to effect an air-tight seal therebetween when contact is made. At the other end of the sealing member 44, a bearing surface 48 is positioned opposite a shoulder 50 on the piercing member 22. Movement of the bearing surface 48 toward the shoulder 50 exposes the needle 28. An O-ring 52 is seated in a groove in the sealing member 44 and bears circumferentially against the cylindrical wall of the pocket 40 for frictionally retaining the sealing member 44 seated in the pocket 40 of the receptacle 32. Another O-ring 54 disposed in another groove in the sealing member 44 bears against the outer surface of the piercing needle 28 and serves to create an air-tight seal therebetween thus eliminating a path for outside air from entering the system. Both O-rings preferably comprise TFE plastic.

Figure 4:
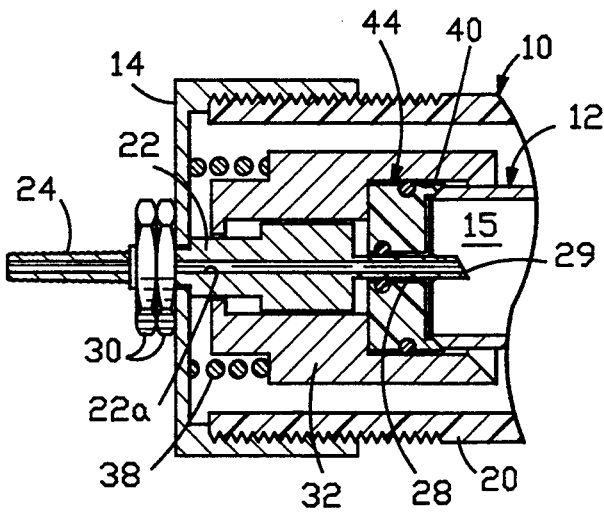
FIG. 4 is a partial sectional view taken along line 4—4 in FIG. 1 showing the retainer fully closed with the piercing needle penetrating the cartridge membrane.

When the filtering element 12 is first installed into the chamber 11 and the end cap 14 is screwed on, the internal chamfer 46 contacts the end 47 of the filtering elephant 12 and starts to create an air-tight seal. As the end cap 14 is further tightened and the flange 34 separates from the shoulder 36 as shown in FIG. 3o Further tightening now drives both needles 28 through the membranes 58. The penetration continues until shoulder 50 contacts the bearing surface 48. As shown in FIG. 4, the tips 29 of the piercing needles 28 are fully embedded into the reagent 15 and a gas passageway is established between the inlet hose 16, through the reagent 15 and the outlet hose 17 where clean gas is now available for the system process.

Figure 5:
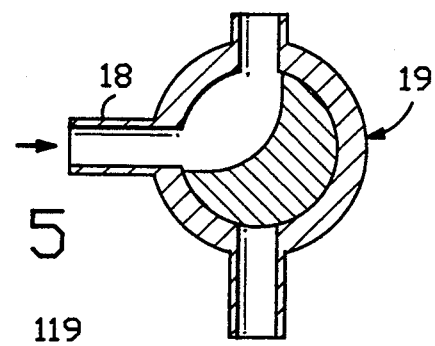
FIG. 5 is a sectional view of the valve in the dump position taken along line 5—5 in FIG. 1.

In use, when it is determined that the filtering element 12 must be replaced, the following procedure would be employed:

the two-way valve 19 would be set into the exhaust or dump position as shown in FIG. 5 for the gas to flow in the direction of the arrows shown. In this position, the system downstream of the valve 19 is sealed off from contamination from the outside air;

the end cap 14 is then unscrewed allowing the springs 38 to urge the receptacles 32 over the needles 28 forcing then to withdraw from the spent filtering element 12. This allows separation of the receptacle 32, the piercing member 22 and other associated components that have been described thereby providing access to the spent filtering element 12 and permitting its removal. During this procedure, the flow of gas upstream of the filter retainer 10 is maintained preventing outside air from entering any part of the input side of the fluid line because of the pressure of the flowing gas;

a replacement filtering element 12 is inserted into the pocket 40 of the receptacle 32 associated with the other end cap 14a;

the receptacle 32 associated with the end cap 14 is fitted over the end 47 of the filtering element 12 and the end cap 14 is threadedly engaged with the hollow tube 20; and the end cap 14 is then tightened over the tube 20 causing the chamfered surface 46 of the sealing member 44 to seat against the end 47 of the filtering element 12 causing both sealing members 44 to con, press and isolate the system from the outside air. While the system becomes fully sealed, the receptacles 32 are forced apart against the force of the springs 38 exposing the piercing needles 28. The piercing needles 28 then simultaneously penetrate the filter membrane 58 and insert themselves into the filter reagent 15.

Figure 6:
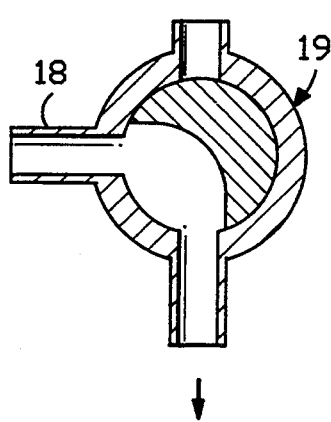
FIG. 6 is a sectional view of the valve in the feed-through position taken along line 6—6 in FIG. 1.

The system is now intact, and after determining that only the system gases are passing through the filtering element 12 and out the exhaust port of the valve, the valve 19 is repositioned into the feed through position as shown in FIG. 6 for gas to flow into the system in the direction of the arrows shown.

In the embodiment described, the chambered surface 46 of the sealing member 44 can rub against the end 47 of the filtering element 12 during the sealing operation. Rotational motion of the end cap 14 can be transmitted through the coil springs 38, the receptacle 32 through to the sealing member 44. This rubbing action can separate or tear a weak membrane 58 from the filtering element 12 before the sealing becomes effective. Although anti-friction elements such as thrust bearings can be inserted between the spring 38 and either the end cap 14 or the spring bearing face of the receptacle 32 to prevent rotation from being transmitted, another configuration is preferred.

Figure 7:
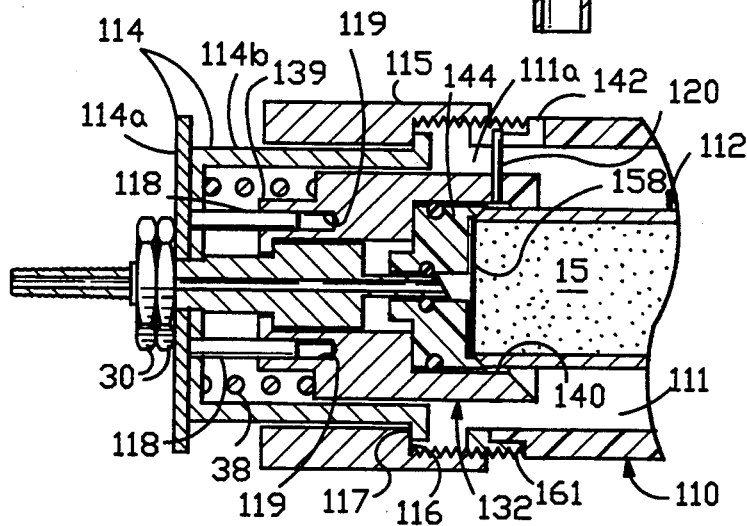
FIG. 7 is a partial sectional view showing an alternative embodiment of the invention wherein relative rotary motion between the receptacle and the filtering element is precluded.

In an alternative embodiment shown in FIG. 7, the open end of the housing 110 is shown; the other end is identical to that shown in FIG. 2. One end cap 114 comprising a disc 114a and a cup member 114b is shown. The retainer housing 110 is modified to include a tightening ring 115 threadedly engaged to the open end of the housing 110. The ring 115 includes a shoulder 116 positioned to abut the surface of a circumferential lip 117 integral with the cup member 114b. Tightening rotation of the ring 115 will act to pull the end cap 114 into the chamber 111 of the retainer housing 110. To keep the end cap 114 from rotating during the rotation of the ring 115, at least one first guide pin 118 is fixed to the inner surface of the cup member 114b and extend perpendicular therefrom into the chamber 111. This pin 118 is aligned with a closely fitting hole 119 in the end 139 of the receptacle 132. The receptacle 132 is, in turn, prevented from turning by at least one second guide pin 120 that is fixed to the receptacle 132 at the end where the pocket 140 is formed and extends radially outward. The pin 120 is aligned with a closely fitting longitudinal slot 142 provided in the tube 110 extending from the opening. The guide pins 118, 120 and their associated hole 119 and slot 142 cooperate to permit only translatory motion of the end cap 114 along with the receptacle 132 and sealing member 144 when the ring 115 is rotated. When the end cap 114 is installed and tightened while the housing tube 110 is grasped, no rotary motion can be imparted to the sealing member 144. In this way, any relative torsional rubbing motion between the sealing member 144 and the membrane is prevented thereby eliminating the possibility of separating the membrane 158 from the filtering element 112. The piercing action that occurs after sealing remains the same as previously described.

The open end portion 111a of the housing 110 is fabricated of a metal section 161 in order to minimize thread wear that could occur from frequent opening and closing of the housing 110.

In the use of this alternative embodiment, the procedure previously outlined would be followed understanding that the reference numerals refer to similar components of the different embodiments.

While the preferred embodiments of the invention are described, it will be understood that the invention is in no way limited by these embodiments.

What is claimed is:

1. A gas filter comprising:
   a. a gas filtering element for cleansing a gas passing therethrough, said filtering element having oppositely disposed end portions, each including an opening, and further including a piercable membrane affixed over each of said openings;
   b. a housing including an elongated tubular member having a surrounding wall, said tubular member closed at one end and open at the other end defining a chamber receptive of said gas filtering element;
   c. an end cap removably connected to the open end of the tubular member for providing the chamber closed at both ends, the connected end cap axially movable into and out of the closed chamber;
   d. a pair of oppositely disposed piercing members, one affixed to the closed end of said tubular member and the other affixed to the connected end cap, each piercing member including an elongated portion extending axially into the closed chamber, each elongated portion terminating in a piercing tip positioned for penetrating the membranes of the inserted filtering element upon axial movement of said end cap into the closed chamber, each piercing member further including means defining a longitudinally extending throughbore for providing a gas passageway into the closed chamber;
   e. a pair of movable receptacles, one axially slideably attached over the elongated portion of said one piercing member and the other receptacle axially slideably attached over the elongated portion of said other piercing member, each receptacle having means defining a pocket for receiving one end portion of the filtering element;
   f. a sealing member disposed within each of said pocket means;
   g. spring means disposed between each receptacle and the ends said closed chamber for urging the receptacles into the closed chamber;
   h. means for preventing rotational motion of said other receptacle and said connected end cap during axial movement thereof, said means for preventing rotational motion disposed on said other receptacle and on the end cap and on the tubular member; and
   i. a tightening ring threadedly engaged with the open end of the tubular member and having a shoulder abutting the end cap for imparting axial movement to said end cap, wherein in response to rotation of said tightening ring, the shoulder urges the end cap into said chamber, in turn urging the other receptacle into the closed chamber, allowing the pocket means to receive the end portions of the filtering element and wherein continued inward motion of said end cap brings said sealing members into contact with the end portions of the received filtering member compressing said spring means and compressibly confining the filtering element between the receptacles and simultaneously affecting an air tight seal between the sealing member and the end portions of the filtering element, and wherein continued inward movement of said end cap forces the piercing tips through the membranes of the received filtering element establishing an isolated continuous gas passageway extending axially through the closed chamber for effectively cleansing throughflowing gas.

2. The device as recited in claim 1 wherein the means for preventing rotational motion of the other receptacle comprises:

at least one first guide pin affixed to the end cap and extending axially into the closed chamber;

means defining an elongated aperture axially disposed in the other receptacle for slideably receiving said first guide pin a second guide pin affixed to the other receptacle proximate to said pocket means and extending radially outward therefrom; and means defining a keyslot disposed through a portion of the surrounding wall of said tubular member, said keyslot extending axially from the open end of the tubular member and configured slideably receive said second guide pin.

3. The device as recited in claim 1 wherein said sealing member comprises resilient plastic.

4. The device as recited in claim 3 said plastic comprises a tetrafluorethylene polymer.

5. The device as recited in claim 1 wherein each of the piercing members further includes a portion extending out of the closed housing and configured to receive a gas line thereover.

* * * * *